United States Patent [19]
Lawhead

[11] 3,814,248

[45] June 4, 1974

[54] METHOD AND APPARATUS FOR FLUID COLLECTION AND/OR PARTITIONING

[75] Inventor: Creighton M. Lawhead, Corning, N.Y.

[73] Assignee: Corning Glass Works, Inc, Corning, N.Y.

[22] Filed: Feb. 23, 1972

[21] Appl. No.: 228,573

Related U.S. Application Data

[63] Continuation-in-part of Ser. No. 178,274, Sept. 7, 1971, abandoned.

[52] U.S. Cl............ 210/83, 210/117, 210/DIG. 23
[51] Int. Cl........................................ B01d 21/26
[58] Field of Search ....... 210/83, 117, 136, DIG. 23

[56] References Cited
UNITED STATES PATENTS

| | | | |
|---|---|---|---|
| 2,581,331 | 1/1952 | Avan et al. | 210/117 X |
| 3,481,477 | 12/1964 | Farr | 210/DIG. 23 |
| 3,508,653 | 4/1970 | Coleman | 210/DIG. 23 |
| 3,512,940 | 5/1970 | Shapiro | 210/DIG. 23 |
| 3,586,064 | 6/1971 | Brown et al. | 210/DIG. 23 |

Primary Examiner—John Adee
Attorney, Agent, or Firm—Burton R. Turner

[57] ABSTRACT

Spools or partitioning assemblies, utilized with rigid tubular containers (adapted to serve as fluid specimen collection or fluid-retaining tubes), for effecting either the physical or the complete physical and chemical partitioning of the heavier fluid phase from the lighter fluid phase of a centrifugally separated fluid specimen, wherein each spool has a central axial orifice and a resilient annular wiper portion, including a container-contacting surface, adapted to sealingly engage the inner surface of the container, as well as an integral annular skirt portion, with the tapering inner surface of the latter serving as a continuation of the spool central axial orifice. The spools, by having specific gravities that are intermediate of those of the separated fluid phases, are adapted to move downwardly in the tubular containers in response to centrifugal force, only to the vicinity of the fluid phase interface, with the lighter fluid phase flowing freely upwardly only through the central axial orifice. Physical partitioning may be effected by the combination of a spool or spool-diaphragm in conjunction with a natural plug of the heavy phase fluid, with this plug making at least a continuous network across the central orifice and thereby retaining the heavy fluid phase from passing through the orifice. Complete physical and chemical partitioning is effected by the combination of a spool and float member, with the latter, by also having a specific gravity intermediate those of the separated phases, being adapted to make at least a continuous line contact seal on the inner surface of the spool skirt portion. The partitioning assemblies may be utilized in closed-system (evacuated) fluid collection tubes or may be user-inserted into opened (atmospheric pressure) tubes after specimen collection.

One method of effecting complete physical and chemical partitioning of the lighter and heavier fluid phases involves freely disposing a float member within the container; providing the container with a spool that is in continuous sealing contact with the inner surface of the container; moving the spool downwardly therein in response to a centrifugal force, thereby establishing an upward flow of the lighter fluid phase only through the spool central axial orifice; and establishing a continuous line contact seal between the float member and the spool central orifice when the spool reaches the fluid phase interface.

Other methods include the physical partitioning of the heavier fluid phase from the lighter fluid phase.

22 Claims, 12 Drawing Figures

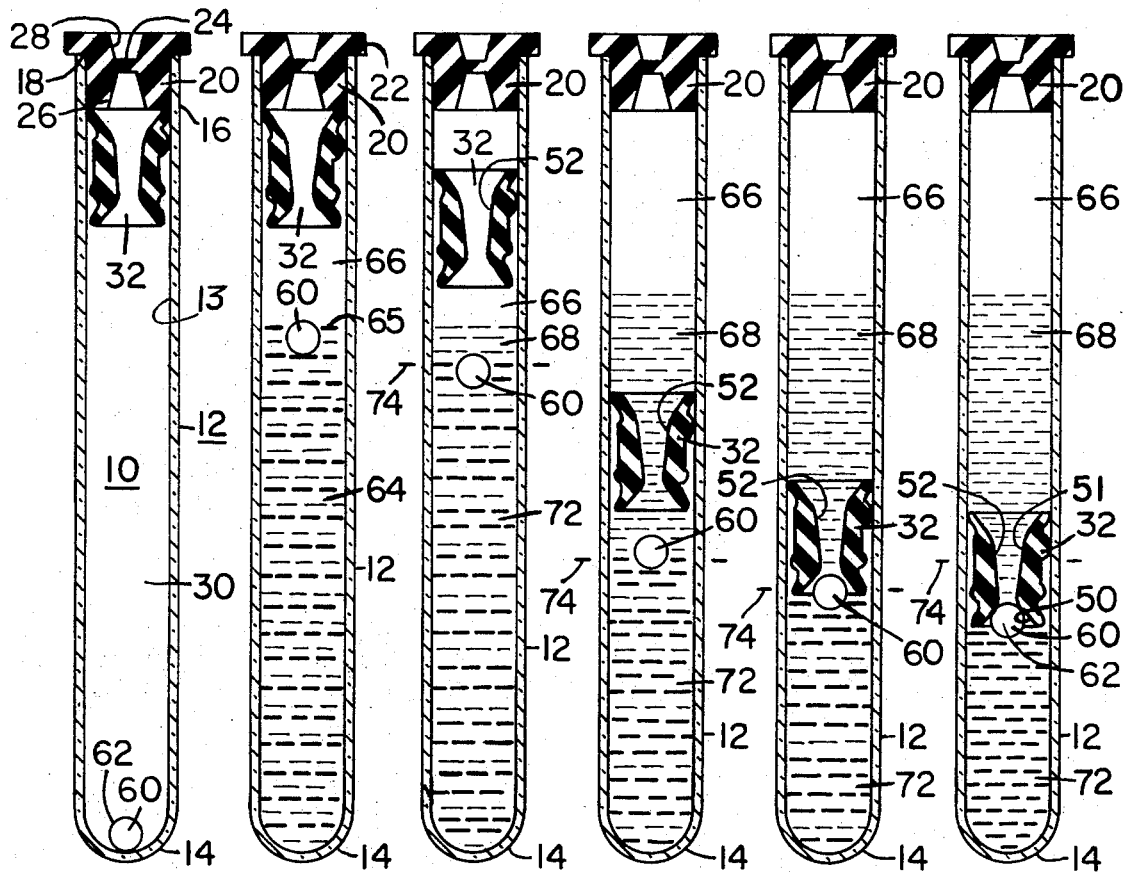
Fig. 1  Fig. 2  Fig. 3  Fig. 4  Fig. 5  Fig. 6
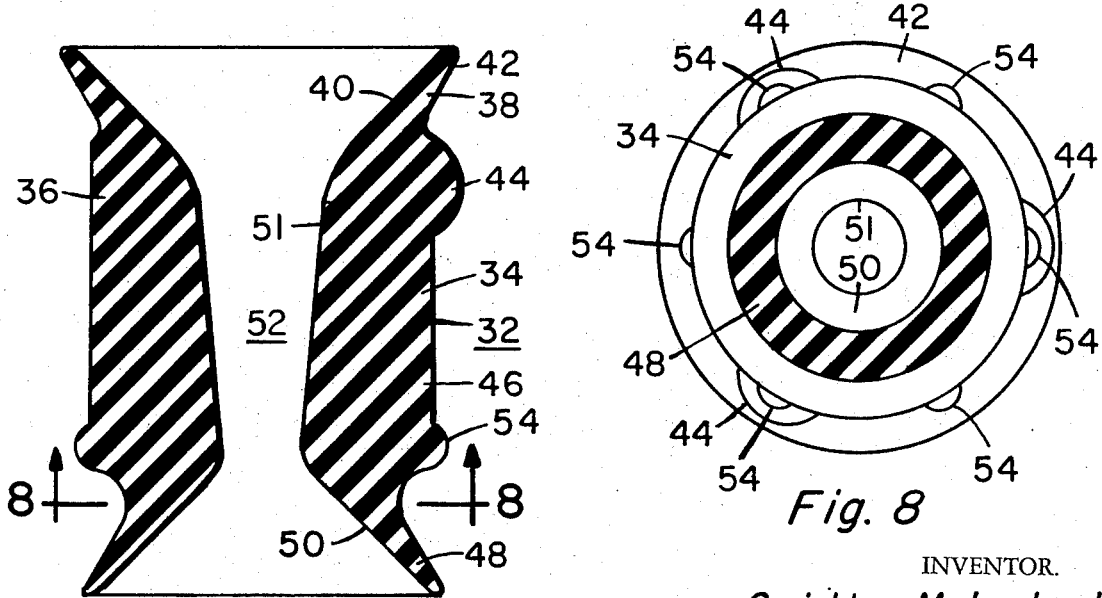
Fig. 7
Fig. 8
INVENTOR.
Creighton M. Lawhead
BY
ATTORNEY

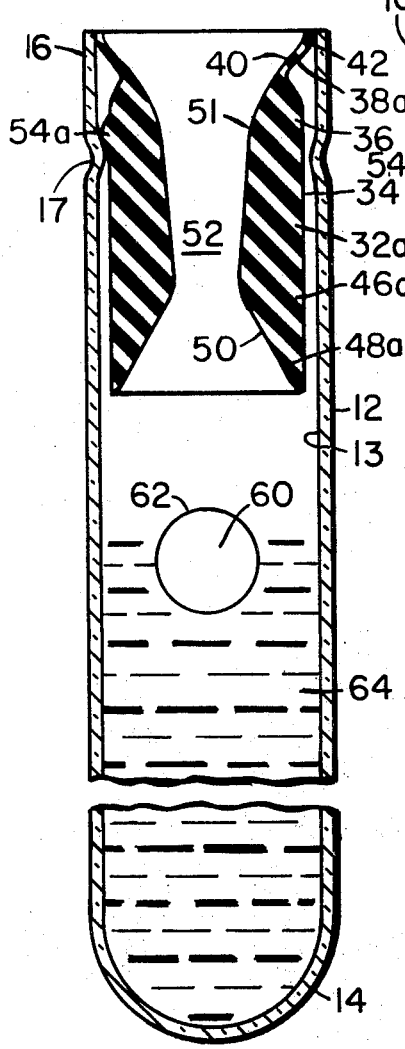
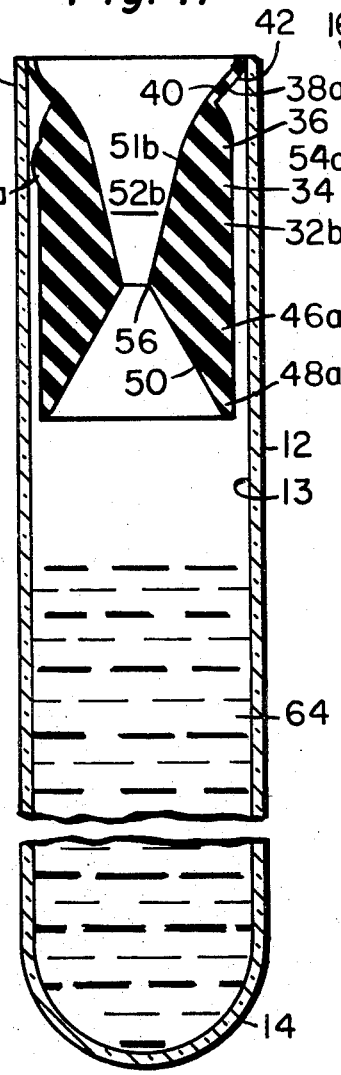
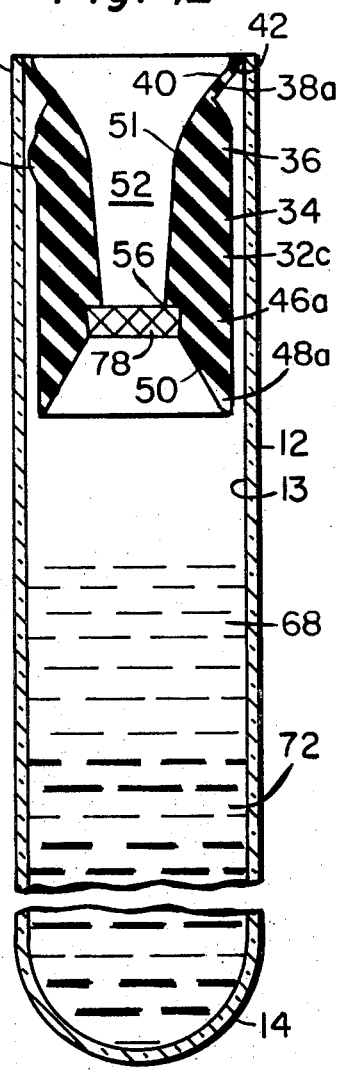
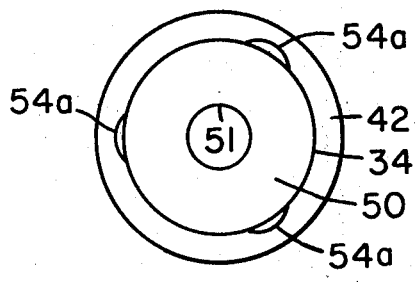

METHOD AND APPARATUS FOR FLUID COLLECTION AND/OR PARTITIONING

This is a continuation-in-part of copending application, Ser. No. 178,274 filed Sept. 7, 1971 and entitled "Method and Apparatus for Fluid Collection and Partitioning", which is now abandoned.

BACKGROUND OF THE INVENTION

1. Field of the Invention

This invention relates to a method and apparatus for the collection and partitioning of a separable two-phase fluid within a unitary container. More specifically, it pertains to the collection of whole blood and, after the separation thereof, the partitioning of blood serum or blood plasma from the blood cells.

2. Prior Art

In the standard evacuated blood sampling tubes, such as the system illustrated in U.S. Pat. No. 2,460,641 to Kleiner, a glass tube has one permanently closed end and the other end is closed by a rubber stopper having a pair of opposite top and bottom axial recesses separated by an intermediate diaphragm. A cup-like holder having a double ended hollow needle, with one end terminating axially within the holder and the other end terminating axially outside the holder, is used to receive the stoppered end of the glass tube, with the inner needle end being adapted to extend through the stopper diaphragm into the evacuated tube. The outer needle end is injected into the patient's vein and then, by forward thrust on the tube, the puncturing of the stopper diaphragm is completed to withdraw the blood. When the desired quantity of blood has been collected in the tube, the holdertube assembly is extracted from the patient and the filled tube is removed from the cuplike holder thereby obtaining a stoppersealed collection tube housing a blood sample.

Blood or another fluid collected in the previously described collection device is then generally returned to the laboratory for processing. The contents may be utilized as whole blood or separated into a lighter phase (serum or plasma) and a heavier phase (cells). If, for example, it is desired to obtain blood serum, (after an initial time period during which the filled tube assembly is allowed to stand) the filled tube assembly is placed into a centrifuge which completes separation into two blood phases. Disposed at the bottom of the tube will be a heavy phase or high density portion of the fluid consisting of packed blood cells and fibrin, while disposed at the upper part of the tube will be the lighter phase of low density portion of the fluid which is blood serum. The separated serum is then analyzed, generally after first being removed from the tube assembly by decanting and/or siphoning (which require removal of the stopper).

It is well known that once the blood phases are separated, if the lighter phase is not removed from the tube within a short time, interaction will occur between the separated phases and inaccurate test results will be obtained. In addition, even if the lighter phase is presently removed from the container there are the hazards of contamination of the sample and of possible mismarking of the removed sample. Furthermore, there are also hazards to the laboratory personnel who may be exposed to disease-carrying blood samples containing, for example, hepatitic serums.

Coleman, in U.S. Pat. No. 3,508,653, made an advance over the blood sampling tube of Kleiner by introducing and attaching a resilient piston directly beneath the tube closure or stopper, with the piston being adapted to be punctured during the initial filling of the sampling tube. After initial centrifugation, in order to obtain the desired blood phase separation, and in response to further centrifugal force, the piston is designed to move downwardly through the light blood phase, with the piston being adapted to permit upward flow of the light phase therearound, i.e., between the container inner wall surface and the outer peripheral surface of the piston. The piston, which has a wiper portion that makes an initial sealing contact with the container inner surface, loses this sealing contact during its downward movement (to permit the flow of fluid therearound) and thereafter is designed to make a final sealing contact with the container inner surface at a position not lower than a position intermediate the separated phases by stopping the downward movement by terminating the applied force. In addition, the piston, which is initially detachably secured to the stopper, requires passageway means and a vent opening therewithin to facilitate the passage of gases to permit descent of the piston but resist the passage of fluids therethrough.

While the Coleman device provides a unitary sealing member between the blood cells and the plasma or serum, it does have several shortcomings. The piston and stopper must be held in intimate contact with each other, otherwise blood which flows into any space between them during the tube filling operation will remain above the piston, and the blood cells will contaminate the lighter phase. Once these blood cells find their way above the piston wiper, they cannot be separated, since no mechanism or method has been provided to permit them to move below the piston.

In addition, there are no positive means incorporated into the Coleman device to prevent blood cells from moving upward past the piston wiper. The inventor apparently assumes that since the piston is delayed for a finite period of time before it follows the cells (heavy phase) that all cells will be trapped below the piston wiper. During downward movement of the piston, however, the wiper does not make intimate contact with the tube inner wall but instead is separated therefrom so as to permit an annular space to be formed through which the upwardly moving light phase might pass. Simple calculations have shown that, even at a relatively slow movement of the piston, for example 1 inch per second, the displaced light phase achieves surprisingly high velocities through the annular space, with the width of the annular space being more than adequate to easily pass blood cells. Actual observations in the laboratory confirm that in spite of the general downward movement of the heavy phase, due to the influence of centrifugal force, some blood cells do indeed become caught up in the fast-moving light phase stream and are carried past the piston wiper into the upper chamber of the tube. As noted, once the cells find their way above the piston wiper, there is no way to return them to the lower portion of the tube.

Since the introduction of the blood sample into the tube may also permit some air to enter the tube upon withdrawal from the patient and since some gases are evolved from the blood sample, they must be vented from below the piston to eliminate the retarding effect they will have on the downwardly moving piston through a buoyancy effect. While Coleman speaks of incorporating a vent opening into the piston design, actual experience has shown that the vent cannot readily be incorporated into the design at manufacture but is preferably made by the technician during the blood drawing operation, thereby putting the burden of creating a satisfactory vent upon the skill of the operator. The needle puncture in the piston diaphragm (for the filling of the tube) serves as a vent for air and gases during piston descent. An improperly punctured diaphragm vent may either refuse to operate at all or may rupture and blow out when the piston impacts the fluid surface during centrifugation and thus completely loses its ability to act as a seal between the light and heavy blood phases during piston descent. In either instance, unfortunately the separation step becomes aborted.

After the collection tube is filled with blood, the internal vacuum is essentially neutralized. However, some vacuum generally remains in the space between the piston wiper and the stopper thus either tending to draw unwanted blood into this space or adding to the restraining force that tends to keep the piston from releasing and starting its downward movement into and through the lighter phase.

SUMMARY OF THE INVENTION

The instant invention, both in terms of apparatus and method, responds to each of the previously-described shortcomings in a manner so as to completely eliminate any further concern regarding such problems.

The several embodiments of the spools or partitioning assemblies of this invention are utilized with elongated, unitary, rigid tubular containers that are adapted to serve as fluid-collection (or fluid retaining) tubes.

The movable spools, each of which has a generally cylindrical main body portion with a central axial orifice and an outside diameter less than the inside diameter of the containers, also have a resilient annular wiper portion tapering outwardly away from the upper portion of the main body portion, with this wiper portion also having a container-contacting surface adapted to sealingly engage the inner surface of the container. The spool main body portions preferably are also provided with a plurality of spaced, raised, guide areas having a maximum collective diameter less than the inside diameter of the container, but greater than the outside diameter of the main body portion. The spools also have an annular skirt portion that extends from the lower portion of the spool main body portion, with the tapering inner surface of the skirt portion serving as a continuation of the spool central axial orifice.

The spools of this invention may be used for effecting either the physical partitioning or the complete physical and chemical partitioning of the heavier fluid phase (such as cells or cells and fibrin) from the lighter fluid phase (such as plasma or serum) of a centrifugally separated fluid (such as whoel blood). The spools, by having specific gravities that are intermediate those of the separated fluid phases, are adapted to move downwardly in the tubular containers in response to centrifugal force, with the lighter phase flowing freely upwardly only through the spool central axial orifices, with each spool further being adapted to stop moving downwardly when it reaches the vicinity of the fluid phase interface.

Physical partitioning only, is effected in one instance by the combination of a spool with a natural plug of coagulated cells and fibrin that makes at least a continuous mass or network across the spool central axial orifice and thus restrains the cell and fibrin phase from passing back through the orifice. In another instance, physical partitioning only, is effected by the use of a spool, having a porous diaphragm or filter (with predetermined size openings that do not permit the passage of fibrin therethrough) that is secured within and across the spool central axial orifice. The spool and diaphragm assembly, in conjunction with the fibrin trapped therebelow physically partitions the cell phase from the serum phase. In both of these instances it must be remembered that physical partitioning of the two phases is adapted only for those uses wherein the lighter phase is to be removed and analyzed within the time limits dictated by good clinical practice.

Complete physical and chemical partitioning of the lighter and heavier phases is effected by the combination of a spool and a float member, with the float member also having a specific gravity intermediate those of the lighter and heavier phases. This complete partitioning is accomplished between the spool and float member, with the float member being adapted to make at least a continuous line contact seal on an annular surface portion of the inner surface of the spool annular skirt portion. If it is desired to have chemical and physical partitioning, as well as the enhancement of filtering, a spool and diaphragm assembly, together with a float member, may also be utilized.

The spools or partitioning assemblies of this invention may be utilized in several different operational sequences. One operational sequence applies specifically to a fluid collection and partitioning assembly that is intended to remain closed (vacuum sealed) from the time of manufacture through sampling, preparation and centrifugation of its contents until the lighter phase is to be removed after centrifugation. Of necessity, the spool, or spool and float member must be placed into the collection tube (prior to the evacuation thereof) at the factory.

In another operational sequence, the partitioning device or assembly is user-inserted into an opened collection tube, i.e., at atmospheric pressure, after sample collection. The combination of the partitioning assembly and a collection tube constitutes a fluid-retaining and partitioning assembly.

While the spool-float member combination and the spool-natural plug combination may be used with both the closed system and the user-insertion concept sequences, the use of the spool-diaphragm assembly and the spool-diaphragm-float member combination is limited to the user-insertion concept sequence, since the effective open area of the diaphragm may not permit the free passage of whole blood therethrough during the container-filling operation.

One method of this invention involves freely disposing a float member within the container. The container is further provided with a resilient spool that is in continuous sealing contact with the inner surface of the container. Moving the spool downwardly within the container (in response to centrifugal force) establishes an upward flow of the lighter fluid phase only through the spool central axial orifice. A continuous line contact seal is established between the float member and the spool central orifice when the spool reaches the fluid phase interface, thereby effecting complete physical and chemical partitioning of the lighter and heavier fluid phases. Thereafter the applied force is terminated.

Other methods of this invention involve the partitioning of the cell and fibrin phase from the serum phase.

In comparison with the Coleman device, no puncture or penetration of the spools of this invention is either necessary, or even possible. With reference to the closed system concept, incoming blood freely enters the collection tube through the full-length bore of the spool. Since there is no concern about any blood which enters between the stopper and the collar there is nothing that can go awry or malfunction during the blood drawing procedure, thus greatly enhancing reliability of the system. Furthermore, in both the closed system and user-insertion concepts, since all fluid flow takes place only through the spool central orifice, no flow is permitted not can it possibly take place between the spool outer surface and the inner surface of the collection tube. Thus, there is a continuous liquid sealing contact of the collar with the tube inner wall surface.

The Coleman device requires that the piston be underlying and closely adjacent to the stopper and that the piston be integrally fastened to or mated with the stopper. Since the present invention does not utilize a piston this requirement is purely academic relative thereto. Moreover, the spool functions independently of the stopper and need not be fastened to or otherwise restrained physically by the stopper. In the user-insertion concept, a stopper is not even necessary.

The Coleman device further requires a vent to relieve the air trapped below the piston while at the same time preventing the passage of fluids. The operation of this invention however is such that it does not differentiate between gases and liquids and permits either to flow through the spool orifice. In addition, in the Coleman device, the final sealing of the two blood phases is described as occurring at the piston periphery, whereas in the instant invention the sealing of the separated fluids from one another at the tube inner surface is continuous at all times, with final partitioning of the phases being accomplished within the central orifice of the spool, due to the action of the float member or the natural plug. Furthermore, in the Coleman device, if any blood cells move upward past the piston wiper into the plasma or serum, there is no way that such cells can be returned to the bottom of the tube. In the instant invention, a spool is used whose purpose it is to generate a constriction in the tube at an exact, predetermined location relative to the final cell line in the tube, with the spool itself not performing the sole sealing function. As will be explained in more detail later, even if a material heavier than the lighter phase should be trapped above the partitioning assembly for any reason, continued application of centrifugal force will move the material through the assembly.

Other advantages and features of the instant invention will be understood from the following description in conjunction with the attached drawings.

BRIEF DESCRIPTION OF THE DRAWINGS

FIG. 1 illustrates one of the fluid collection and partitioning assemblies of this invention ready for use, with a spool poised beneath the closure member of the evacuated tubular container and a float member resting freely on the bottom of the container.

FIG. 2 is similar to FIG. 1, but illustrates that, after the introduction of a homogenized fluid sample into the container assembly, the float member rests on or near the surface of the sample.

FIG. 3 illustrates the assembly of FIG. 2 shortly after the start of centrifugation, which begins to separate the homogenized sample into a light phase and a heavy phase, with the spool beginning to descend toward the surface of the light phase and the float member being disposed at the interface of the light and heavy phases.

FIG. 4 illustrates that in the assembly of FIG. 3, as centrifugation continues, the float member continues to be disposed at the light-heavy phase interface, while the spool enters and moves through the light phase by permitting the light phase to flow up through the central axial orifice of the spool.

FIG. 5 illustrates the assembly of FIG. 4 as it nears the completion of centrifugation, with the bottom portion of the spool being in near intimate contact with the float member, which continues to be disposed at the light-heavy phase interface.

FIG. 6 illustrates the assembly of FIG. 5 upon the completion of centrifugation, with the bottom of the spool having moved into the heavy phase and in doing so has securely engaged the float member thereby effecting a seal therewith that separates the light phase from the heavy phase.

FIG. 7 is an enlarged vertical sectional view of one of the spools contemplated by this invention.

FIG. 8, which is a sectional view taken along line 8—8 of FIG. 7, illustrates details of the spool outer peripheral surface configuration.

FIG. 9 illustrates a modification of the spool shown in FIG. 7.

FIG. 10, which is a bottom view of the spool of FIG. 9, illustrates the details of the spool outer configuration.

FIG. 11 illustrates another modification of the spool contemplated by this invention that may be utilized to separate (upon the completion of centrifugation) the light phase (blood serum) from the heavy phase (blood cells) without the use of a float member.

FIG. 12 illustrates yet a further modification of the spool of this invention that may be utilized to separate (upon the completion of centrifugation) the light phase from the heavy phase (without the use of a float member) and filter the fibrin from the light phase.

DESCRIPTION OF THE PREFERRED EMBODIMENTS

Referring now to the drawings in detail, FIGS. 1–6 illustrate one of the fluid collection and partitioning assemblies or container assemblies of this invention both in terms of the various components in correct relationship to each other as well as the operational sequence of the various parts thereof.

FIGS. 1–6 depict a fluid collection and partitioning assembly, more specifically, a blood collection and partitioning tube or container assembly 10 consisting of an elongate, rigid tubular container or collection tube 12; a movable spool or travelling orifice 32; a rigid or resilient float member or plug 60; and a stopper or closure 20; all of which will now be described in more detail.

Collection tube 12, which is made of glass, plastic or other material, and which is usually transparent, has a closed bottom end 14 and an open upper end 16 for receiving a selfsealing stopper or closure 20 formed of medical grade butyl rubber or other suitable material. Closure 20 may be of the shape and material described herein or it may be of the type disclosed in co-pending U.S. Pat. application Ser. No. 178,273 filed Sept. 7, 1971 and also assigned to the assignee of this invention. Stopper 20 as shown, is shaped so as to have a flanged end 22 which abuts and overlies annular end face 18 of collection tube open end 16. Stopper 20 is further provided with diaphragm or septum 24 as well as inner recess 26 and outer recess 28 on the opposite sides of diaphragm 24, respectively. Stopper 20, together with collection tube 12, defines a sealed, closed, fluid receiving chamber 30, which in the arrangement shown in FIG. 1 is adapted, (after previously having been evacuated) to maintain a negative pressure (vacuum) of about 24 inches Hg for the extended period of time. Thus, stopper 20 serves as a sealing closure to preserve the interior vacuum and provides a septum 24 through which the sampling needle (not shown) can reach chamber 30 without destroying its integrity. No invention is claimed for either the previously described collection tube 12 or stopper 20, per se.

Again as shown in FIG. 1, a movable spool or travelling orifice 32 preferably is initially positioned directly beneath stopper 20 although, since spool 32 functions completely independently of stopper 20, it need not be fastened to or be otherwise physically restrained by stopper 20. Spool 32, which is shown in full detail in FIGS. 7 and 8, is preferably made of a resilient material, such as for example a medical grade rubber, to take up the tolerances that are required in the manufacture of collection tube 12 and to provide a desired sliding fit therewithin. This fit should be sufficiently interfering so as to restrain spool 32 against longitudinal movement within collection tube 12 when at rest, and yet permit spool 32 to slide within tube 12 upon the application of an appropriate force, such as that generated during the centrifugation of fluid collection and partitioning assembly 10. The specific gravity (S.G.) of spool 32 should be very near to that of the homogenized phase, e.g., whole blood S.G. of 1.05–1.06, with the preferred range being 1.04–1.055.

Spool 32 has an annular, generally cylindrically-shaped main body portion 34 having a diameter less than the inside diameter of collection tube 12. Main body portion 34 terminates on its upper portion 36 in an outwardly tapering or flaring annular, thin wiper portion 38 having a maximum outer free diameter greater than that of main body portion 34, and greater than the inside diameter of collection tube 12. Inner surface 40 of wiper portion 38 is generally funnel-like or conical in shape and at least an annular portion of outer surface 42, of wiper portion 38, is adapted to sealingly contact inner wall surface 13 of tube 12. While spool 32 may also be made of a rigid material, such as polystyrene, it must at least have a resilient wiper portion 38 in order to accomplish its sealing function. Spool main body upper portion 36 may also have a plurality, i.e., preferably three or more in number, of equally spaced, individual, raised contact areas or generally-rounded friction nubs 44, having a maximum collective outside diameter at least as large as the inside diameter of collection tube 12, with friction nubs 44 therefore being adapted to contact tube inner wall surface 13.

The lower portion 46 of spool main body portion 34 terminates in a slightly outwardly tapering, annular, skirt portion 48 having a maximum diameter less than the inside diameter of collection tube 12 and therefore not making continuous contact with the tube inside wall surface 13. Inner surface 50 of skirt portion 48 is generally conical or funnellike in shape and blends smoothly into the lower portion of slightly tapered main body central aperture or orifice 51. The upper portion of main body central orifice 51 blends smoothly into inner surface 42 of wiper portion 38. Main body central orifice 51 together with surfaces 40 and 50 defines spool central orifice 52. Spool main body lower portion 46 also may have a plurality, i.e., 3 or more in number, of equally spaced, individual, raised and generally rounded areas or guide nubs 54, having a maximum collective outside diameter less than the inside diameter of collection tube 12 and nubs 54 therefore normally do not contact tube inside wall surface 13. The only time that one or more of guide nubs 54 touches tube inside surface 13, is during spinning on an angle-head centrifuge (spinning at an angle to the horizontal). During this spinning cycle, guide nubs 54 may touch tube inside wall surface 13 to keep wiper outer surface 42 in sliding contact therewith. The use of guide nubs 54 is optional, and if they are not used, spool main body lower portion 46 blends smoothly into skirt portion 48.

As shown in FIG. 1, resting freely on closed bottom end 14 of tube 12, is a plug or float member 60, preferably of spherical shape and having a diameter larger than the minimum diameter of the spool central orifice 52 and smaller than the maximum diameter of inner surface 50 of skirt portion 48. Preferably, plug 60 has a diameter of about one and one half times that of the minimum diameter of spool central orifice 52. Plug 60 is made either of a resilient material, such as a medical grade rubber, or of a rigid material such as polystyrene, and should have a specific gravity below that of the heavy phase (red blood cell S.G.=1.08–1.09) and above that of the light phase (blood serum S.G.=1.02–1.03), with the preferred range being 1.04–1.055.

With reference to one of the operational sequences of this invention, FIG. 1 illustrates fluid collection and partitioning assembly 10, ready for use, with stopper 20 together with collection tube 12 defining a sealed, closed, evacuated fluid receiving chamber 30. Contained within chamber 30 are both spool 32, poised beneath stopper 20, and plug 60, resting freely on the bottom of tube 12.

The FIG. 2 assembly depicts the FIG. 1 assembly with the addition of a homogenized fluid sample 64, such as whole blood. After a correct venipuncture has been made on the patient, the inner or butt end of the needle (not shown) is pushed through stopper diaphragm portion 24, thereby permitting the vacuum within the assembly to draw blood freely into tube 12 through spool central axial orifice 52. It should be noted that due to the funnel-like shape of spool wiper inner surface 40, as well as the sealing contact of at least an annular portion of spool wiper outer surface 42 with tube inner surface 13, the fluid sample is smoothly channelled into and through orifice 52 and no fluid flow is permitted around the outside of spool 32, i.e., between the outer surface of spool 32 and tube inner surface 13. During the taking of fluid sample 64 and upon the completion thereof, plug 60, due to having a specific gravity lower than that of the sample, rests on or near sample top surface 65. Any remote tendency of plug 60 to block off the flow of incoming fluid 64, during the taking of the sample, cannot materialize because of the differential pressure which exists between incoming sample 64 and the vacuum within tube 12 and which keeps spool orifice 52 open.

FIG. 3 illustrates the assembly of FIG. 2 shortly after the start of centrifugation which begins to separate homogeneous fluid sample 64 into a lighter phase 68 and a heavier phase 72. Plug 60, by virtue of its intermediate specific gravity, is disposed at or near the interface 74 between lighter and heavier phases 68 and 72, respectively, with the location of interface 74, for the sake of clarity, being shown as two dashes on either side of tube 12. During centrifugation, heavier phase 72, because of its higher specific gravity (relative to lighter phase 68) starts to move toward tube bottom 14, leaving less dense lighter phase 68 thereabove. Spool 32, similarly because of its specific gravity, starts to move downward, away from stopper 20, toward lighter phase 68. It must be remembered that plug 60 is always free to seek and float at the fluid gradient level, i.e., interface 74, closest to its own specific gravity. Spool 32, while having a specific gravity similar to that of plug 60, is however somewhat restrained by the tube side wall friction due to both the fluid sealing contact of at least an annular portion of wiper outer surface 42 and the touching of friction nubs 44 with tube inner surface 13.

The FIG. 4 assembly shows the FIG. 3 assembly, as centrifugation continues, with plug 60 continuing to be disposed at interface 74, which of course shifts downwardly as centrifugation continues and the heavier phase becomes more compacted. Spool 32 has now entered and is starting to move through lighter phase 68 which in turn flows up through spool central orifice 52. As spool 32 enters phase 68 it is somewhat decelerated since its buoyancy in fluid is greater than its buoyancy in any residual partial vacuum, which may remain (after the introduction of fluid sample 64 into tube 12) in space 66 above sample top surface 65. It should be noted that since spool 32 contains full length central orifice 52, joined to smoothly tapering annular wiper portion 38 and smoothly tapering skirt portion 48, fluids can freely move from one end of spool 32 to the other. Upper inner surface 40 of wiper 38 is funnel-like in shape to permit any red blood cells, fibrin, or other heavy-phase bodies free movement down through orifice 52 under the persuasion of centrifugal force. All fluid flow takes place through orifice 52 and no fluid flow is permitted nor can it possibly take place between the outer surface of spool 32 and tube inside surface 13. Furthermore, fluid flow can occur through orifice 52 in either direction, depending on the initial position of spool 32 relative to the various density components of the fluid which are to be separated. It is acknowledged however that in the majority of instances, and in the preferred mode of operation, fluid flow through orifice 52 will predominantly be in an upward direction. By the same token however, the operation of the instant invention is such that it does not differentiate between gases and liquids and permits either to flow through aperture 52 without prejudice. The flow, either of gases or liquids, is neither restricted nor otherwise influenced in any way by the design or geometry of spool 32 or tube 12. Each phase is free to seek its own flow path and its ultimate position within tube 12 is influenced solely by the persuasion of centrifugal force. As spool 32 enters and moves through lighter phase 68, some of the lighter components or cells of heavier phase 72 (which are eluted from tube inner wall 13 by displaced lighter phase 68), are disposed above spool 32 and plug 60 as spool 32 displaces an equal volume of fluid. It should be noted that when spool 32 impacts upon the surface of lighter phase 68, any air or gases trapped in the annular space or area defined by the outside surface of the spool 32, spool wiper 38, tube wall inside surface 13 and the surface of lighter phase 68, become momentarily compressed, until flexible spool wiper 38 yields sufficiently to permit passage of the air or gases as spool 32 submerges further into lighter phase 68.

FIG. 5 illustrates the assembly of FIG. 4 as it nears the completion of centrifugation. Plug 60 continues to be disposed at phase interface 74, but is now in imminent contact with skirt inner surface 50 of spool 32, with spool 32 continuing to move downward through lighter phase 68 under the persuasion of the externally applied centrifugal force. At this time, some of the lighter components or cells of heavier phase 72 may still remain in spool central orifice 52 and perhaps thereabove.

FIG. 6 illustrates the assembly of FIG. 5 upon the completion of centrifugation, i.e., all the parts are now in final position. Upon the completion of centrifugation the maverick lighter components or cells of heavier phase 72 (previously in or above spool central orifice 52), still having a specific gravity greater than that of plug 60, have now eased downward past plug 60. Spool 32 has now partially moved into heavier phase 72, coming to rest at a density level equivalent to its own specific gravity. As shown in FIG. 6, skirt portion 48 of spool 32 has entered heavier phase 72 and has securely engaged plug 60, with plug peripheral surface 62 abutting and making a line contact with and on spool skirt inner surface 50. It should be noted that plug 60 has been pushed below the level of its equivalent fluid density i.e., below interface 74, by spool 32, thereby effecting a seal that separates lighter phase 68 from heavier phase 72. It should further be noted that spool main body orifice 51 is completely free of all components of heavier phase 72, while interface 74, due to the entrance of spool skirt portion 48 into heavier phase 72, has now been displaced and rises above the plane of the spool-plug seal. If the homogenized test fluid 64 is whole blood, then the heavier phase 72 is now blood cells and the lighter phase may be either blood serum or blood plasma, depending upon whether or not the whole blood sample was coagulated or not coagulated, respectively.

In the FIG. 6 assembly, spool 32 is shown in the state of neutral buoyancy. The bottom section or skirt portion 48 of spool 32 has entered heavier phase 72, decelerated to zero, and spool 32 now acts as a constriction within tube 12. Plug 60 exerts an upward force against spool 32 because of its buoyancy relative to heavier phase 72, and the downward force of spool 32 is equal to the upward force of valve member 60, resulting in zero net movement. Thus, all buoyancies are in balance and no further spool or valve member movement takes place.

Flow of lighter phase fluid 68 through spool central orifice 52 no longer takes place, there now being no displacement of fluid. Plug 60, because of its relatively low specific gravity, continues to be buoyed upward and, since there no longer is any lighter fluid phase flow occurring plug peripheral surface 62 is firmly forced against its mating surface on spool skirt inner surface 50, thus closing off spool main body central orifice 51 and providing a positive seal between lighter phase 68 and heavier phase 72.

It is important to note that if any blood cells, fibrin, or other solid and heavier materials should be trapped above the spool-plug seal for any reason, such as might occur if the seal between spool 32 and plug 60 is made before complete separation of the homogenized fluid is completed, continued application of centrifugal force will cause the heavier material to move into the funnel-shaped spool wiper 38, through spool main body orifice 51 and past plug 60. Being of greater density than plug 60, such material will push plug 60 aside and move below it. Plug 60 will then reseal itself against spool 32 after the passage of such material. The ability of fluid collection and partitioning assembly 10 to pass or "swallow" heavier material remaining above the spool-plug seal, even after the seal has been made, is unique.

Up to this point the only operational sequence described has been one limited to a fluid collection and partitioning assembly 10 consisting of collection tube 12, stopper 20, spool 32 and plug 60, with tube 12 together with stopper 20 defining a sealed, closed, evacuated fluid receiving chamber 30. This operational sequence, which is shown, with reference to spool 32 and plug 60, in FIGS. 1–6, applies specifically to a fluid collection and partitioning assembly that is intended to remain closed from the time of manufacture, through sampling, preparation and centrifugation of its contents until the lighter phase is to be removed after centrifugation. Of necessity, the spool and plug were placed into tube 12 (prior to the evacuation thereof) at the factory. This sequence will hereinafter be referred to as the "closed system" concept to differentiate it from a "hand or user insertion" concept.

In an operational sequence utilizing the "hand insertion" concept, a partitioning device or assembly, such as spool 32 and float member 60, is hand inserted into an opened collection tube after sample collection, preferably either after coagulation has been completed or after partial phase separation has been effected (upon completion of coagulation). A partitioning device or assembly can be inserted into an opened collection tube even before coagulation has been completed, however since blood cells exhibit a tendency to harden on the walls of the opened tube it is preferable to delay the opening of the collection tube until coagulation has been completed therein.

With reference to the operational sequence utilizing the "hand insertion" concept, FIGS. 2 and 3 may be utilized to illustrate a well known evacuated blood collection tube assembly comprised of collection tube 12 and stopper 20. Once blood sample 64 has been introduced into this assembly and preferably either after coagulation (FIG. 2) or after partial phase separation (FIG. 3), stopper 20 is removed and float member 60 and spool 32 are hand inserted into tube 12 in that order. After the partitioning device is inserted into opened tube 12, stopper 20, in accordance with good medical practice, preferably is replaced thereon, and centrifugation can begin (FIG. 2) or be continued (FIG. 3). Hereinafter, the operational sequence proceeds in a manner and with a result identical to that already described with reference to the "closed system" concept shown in FIGS. 4–6.

FIG. 9 and 10 disclose a simplified modification 32a of spool 32 shown in full detail in FIGS. 7 and 8. FIG. 9 shows spool 32a in the installed condition, i.e., inserted into tube 12, while FIG. 10 shows a bottom view of spool 32a in its free form. The basic differences between spools 32 and 32a are that the latter has a more flexible wiper portion 38a of uniform (instead of tapered) cross-section, its spool main body lower portion 46a does not utilize the optional guide nubs 54 of spool 32, and portion 46a blends smoothly and directly into the outer surface of slightly outwardly-tapering skirt portion 48a. In addition, its friction nubs 44 (on spool main body upper portion 36) have been deleted and replaced with a plurality, i.e., preferably three or more in number, of equally spaced guide nubs 54a. Guide nubs 54a are substantially similar to previously discussed friction nubs 44 (FIG. 8) except that the maximum collective outside diameter of the former is less than the inside diameter of tube 12. (The only time that one or more of guide nubs 54a touches tube inside surface 13 is in the descent of spool 32a, during spinning on an angle-head centrifuge.) Except for the above-noted difference, spool 32a is substantially similar, both in structure and function, to spool 32 and all other features (and the respective numerals) of the latter apply equally to the former. As spool 32a can be used in a manner identical to that of spool 32, both the "closed system" and "hand insertion" concept sequences (previously described with reference to spool 32 and float member 60 in FIGS. 1–8), may be utilized. Since spool 32a does not utilize the friction nubs 44 of spool 32, only wiper portion 38a actually makes contact with tube inner surface 13 and is thus the only restraint that keeps spool 32a from moving downwardly within tube 12. In the "closed system" concept sequence, tube upper end 16 is preferably provided with a slight constriction 17 which serves as a contact for the restraint of guide nubs 54a to limit movement of spool 32a during the handling and the vibrations commonly encountered in shipping. Thus, it is the sole function of constriction 17 to restrain spool 32a from unwanted initial movement due to handling and shipping, and is in no way necessary for the filling of the tube and subsequent function of spool 32a.

FIG. 11 discloses another simplified modification 32b of spool 32, with spool 32b being substantially similar to previously-described spool 32a (FIG. 9). The basic difference between spool 32a and 32b is that the latter has a smaller minimum diameter main body central orifice 51b, with orifice 51b, together with surfaces 40 and 50, defining spool central orifice 52b. The minimum diameter 56 of main body central orifice 51b, which occurs in the vicinity of the intersection of orifice 51b with skirt inner surface 50, should be at least as large as the inside diameter of the needle or cannula used in the "closed system" collection of the sample into collection tube 12, and preferably is kept in the range from 0.030 to 0.060 inch for "hand insertion" although larger diameter openings are also feasible.

Spool 32b, although very similar to spool 32a, by reason of its substantially smaller central orifice 51b, does not require a plug member or float 60 to accomplish a partitioning function. Without plug member 60, the operation of spool 32b is altered, with respect to spool 32 or 32a, only insofar as the reduced bore diameter 56 (about 1.5mm. vs. about 3mm.) may slightly reduce the rate of descent of spool 32b through the blood sample. This is especially so if spool 32b is operating in coagulated blood without prior centrifugation. Under this condition of operation, cells and any fibrin present above the spool will be "swallowed", thereby passing down through bore or central aperture 52b as centrifugation proceeds. After centrifugation, the fibrin, being less dense than the heavier phase and more dense than the lighter phase, serves as a natural plug at or below minimum diameter 56 of orifice 52b, to restrain the heavier phase from passing back through orifice 52b during pour-off of the serum. Since the fibrin serves as a natural plug, spool 32b is not recommended for the partitioning of blood plasma and blood cells because of the absence of fibrin.

It must be remembered that spool 32b, while partitioning the lighter and heavier phases, provides only a physical but not a chemical partitioning of these phases. This is in contrast to spools 32 and 32a, which in conjunction with float member 60, provide both a physical and chemical partitioning between the noted phases. Thus, spool 32b, since it provides only physical phase separation, is adapted for routine, daily, in-house hospital use, i.e., it is not adapted for mailing or shipping of the centrifuged sample but for the physical partitioning of the lighter and heavier blood phases wherein the lighter phase is to be removed and analyzed within the time limits dictated by good clinical practice.

The use of spool 32b very significantly reduces the area interface between the lighter and heavier phases since, in one example, it reduces the interphase diameter, i.e., inside diameter of the collection tube to about 1.5mm. (the diameter 56 of spool main body central orifice 51b). Therefore, this diameter reduction greatly reduces the amount of chemical interaction between the two phases, and the fibrin, by acting as a natural plug, effectively restrains the heavy phase from passing through orifice 52a even when collection tube 12 is titled or inverted for pour-off of the serum.

Even though spool 32b does not require plug member 60, it can be used in a manner identical to that of spools 32 and 32a, i.e., both the "closed system" and "hand insertion" concept sequences may be utilized. Again, as with spool 32a, when using the "closed system" concept sequence it is preferable to utilize a tube having a constriction to initially restrain spool 32b.

FIG. 12 discloses yet a further modification 32c of spool 32, with spool 32c also being substantially similar to previously-described spool 32a (FIG. 9). The basic differences between spool 32a and 32c is that while the latter does not require a plug member to accomplish its partitioning function, it has a filter or porous diaphragm 78 secured within its central orifice 52, preferably at or near the point of minimum diameter 56 of main body orifice 51, with this point of minimum diameter 56 occurring in the vicinity of the intersection of orifice 51 and skirt inner surface 50. Spool diaphragm 78, which is used to assure freedom from fibrin in the lighter phase, must be made of non-contaminating and non-sloughing as well as lint-free filter media, like a fine screen or preferably a plug of opencelled foam (rigid or flexible) of such materials as (for example) polyethylene or polystyrene. Diaphragm 78 preferably is press-fitted within a molded caivty in spool orifice 52 and may have a mesh size opening as large as 0.005 inch, for example. Diaphragm 78, which is intended to preclude the occurrence of fibrin bound cells in the lighter phase, should preferably have a specific gravity of 1.04–1.06. The mesh size openings, while small enough to trap fibrin still permit movement, in either direction, of the blood cells.

The use of spool 32c precludes the use of the "closed system" concept sequence since the effective open area of diaphragm 78 may not permit the free passage of whole blood therethrough during the tube filling operation.

During the "hand or user insertion" concept sequence, spool 32c is preferably introduced into tube 12 after partial centrifugation (3 to 5 minutes, for example), and thus at least partial phase separation, have taken place. This will minimize both the occurrence of fibrin above spool diaphragm 78 and any tendency for the underside of diaphragm 78 to have its pores plugged by cells as spool 32c descends downward through cell-bearing serum or plasma. Following centrifugation, in the case of coagulated blood, the tube may be inverted for lighter phase pour-off, free of cells which are trapped below the porous diaphragm, said trapping being further enhanced by the compacted fibrin layer below the diaphragm. In the case of uncoagulated blood, after centrifugation, the porous diaphragm or membrane acts simply as a physical barrier that delays the immediate movement of cells to the lighter phase as the tube is inclined for lighter phase pour-off.

In the "closed system" concept sequence, when blood is slow to clot or when the allowed clotting time is limited, some fibrin may continue to form even after the spool (such as 32, 32a, 32b) has begun its descent, leaving a fibrin plug above the spool, and often a string or floating bits of fibrin in the serum. The use of spool 32c will filter out fibrin strands and establish a floor to prevent fibrin pick-up when aspiration is used to withdraw the serum.

Spool 32c, like spool 32b, again provides only a physical but not a chemical partitioning of the two phases and is therefore adapted only for those uses wherein the lighter phase is to be removed and analyzed within the time limits dictated by good clinical practice. The use of spool 32c also significantly reduces the area interface and resultant chemical reaction between the two phases by reducing the interphase area within the collection tubes.

If it is desired to have chemical and physical partitioning, as well a enhancement by the filtering function of spool 32c, plug 62 may be used in this "hand insertion" mode, also In the instant invention, with all spool embodiments and both operational sequences, sealing of the differing-density fluids from one another at the collection tube inner surface has been continuous since the spool began its descent through the fluid and the separated fluid phases have never been in contact with each other in this area. Final sealing (with reference to spools 32, 32a) or partitioning (with reference to spools 32b, 32c) is accomplished within the central orifice of the spool, due to the action of the float member (for spools 32, 32a), fibrin-cell plug (for spool 32b), or diaphragm (for spool 32c) and is purposefully designed to occur at or just above the light-to-heavy phase interface to ensure the absence of any heavy phase components with the lighter phase sample.

The significant originality of this invention derives to a large extent from the recognition that in a blood collection tube various differential buoyancies can be created between the blood and certain movable components within the tube during the centrifugation process, and these buoyancies can be used to effect a final closing off, sealing or partitioning, of the serum from the heavier blood phases. A tube of whole blood has a given, generally quite uniform, specific gravity between 1.05 and 1.06. A tube of centrifuged blood has many layers or constituents of varying specific gravities, from the heaviest at the bottom to the lightest at the top, with the greatest visible demarcation occurring at the serum/red cell interface. Serum will generally have a specific gravity (S.G.) of 1.02 to 1.03, while the red cell S.G. is 1.08 to 1.09, and the fibrin S.G., after centrifugation, is intermediate those of the cells and serum. During the process of centrifugation the values of these specific gravities will vary infinitely from the generally uniform condition at the start of spin-down to the final values at the end. By recognizing and exploiting these phenomena (by means of design geometry and material selection of the interior moving parts of the system, i.e., spools 32, 32a, 32b, 32c as well as plug 60 and porous diaphragm 78), it has been shown possible to build a fluid or blood collection and partitioning assembly which does not interfere in any way with the passage of fluids during separation and yet at the same time permits the complete physical or combined physical as well as chemical partitioning of the two phases from each other at the completion of the separation.

In the embodiments of this invention that utilize a float member, the spool, with its predetermined buoyancy (relative to the fluids through which it has to move), functions independently of the float or plug member, during centrifugation, because the spool (even though it has the same density as the plug) is somewhat delayed in its function, while the plug has unrestricted freedom. Only at the final moment, when the system reaches a steady state condition, do these two parts meet and cooperate to form the desired physical and chemical seal. Thus, because of the relative independent functioning of the spool and the plug, each can be optimized in design and buoyancy factors to give superior performance. The spool-float member combination embodiments of course provide complete physical and chemical separation of the fluid phases and fill the further requirement that random orientation of the collection assembly following centrifugation, e.g., in mailing or shipping, be tolerated with no deleterious effect being suffered by the separated lighter phase.

The embodiments of this invention that do not utilize a float member, i.e., small-orifice spool 32b and spool 32c with diaphragm 78, operate on the same general buoyancy principle as the spool-float member combination embodiments except that only a physical but not a chemical partitioning of the phases is achieved therewith. Thus, these embodiments are adapted for routine, daily, in-hospital use and are not recommended for mailing and shipping of the centrifuged sample but are designed for sampling situations wherein the lighter phase is to be removed and analyzed within the time periods dictated by sound medical practice.

Once these principles of operation have been recognized it becomes readily evident that any number of differing configurations can be designed to provide the desired advantages. By way of examples, these configurations could include different shaped spools and diaphragms as well as plugs and/or captive plug arrangements wherein the plug is confined within the spool through-bore; as well as the noted captive plug arrangements wherein the plug rests on a springy web, with the resulting valve structure being capable of opening under differential pressure or centrifugal force. Undoubtedly, other configurations of spools would provide similar performance levels, particularly when used in the "hand insertion" concept sequences. Basically, the main function of the spools is to wipe down the tube walls and form at least a partial seal at the serum-cell interface. These spools simplify decanting and limit the diffusion of contamination. To one skilled in the art, many other possible design configurations will become apparent, differing in physical configurations but all utilizing the buoyancy principles disclosed herein. In addition, the principles of this invention may be utilized in partitioning assemblies for fluids other than human blood, e.g., any fluid separable into at least two differing density phases may be separated by utilizing either a spool-float member combination, a small orifice spool or a spool-diaphragm combination, all preferably having a specific gravity intermediate those of the phases sought to be separated.

While the invention has been described in connection with possible forms or embodiments thereof, it is to be understood that the present disclosure is illustrative rather than restrictive and that further changes or modifications may be resorted to without departing from the spirit of invention or scope of the claims which follow.

I claim:

1. In a partitioning assembly for partitioning the heavier phase from the lighter phase of a fluid specimen upon the centrifugation thereof, a spool positionable at the interface of said heavier and lighter fluid phases to at least physically partition such phases from each other within a tubular container, said spool comprising:

a. a generally cylindrical main body portion having an open central axial orifice extending axially therethrough, said main body portion having a maximum outside diameter less than the inside diameter of said container;

b. a resilient annular wiper portion having a container-contacting outer surface adapted to sealingly engage the inner surface of said container and a conical inner surface communicating with said central axial orifice, said wiper portion tapering outwardly from an upper portion of said main body portion;

c. an annular skirt portion extending outwardly from a lower portion of the main body portion of said spool and having a maximum outside diameter less than the inside diameter of said container; and d. the specific gravity of said spool being intermediate those of said heavier and lighter fluid phases.

2. The spool of claim 1 wherein: a. said integral annular wiper and skirt portions have tapering inner surfaces that merge into said central axial orifice; and b. said spool main body portion has a plurality of spaced, raised, guide areas having a maximum collective outside diameter less than the inside diameter of said container, but greater than the outside diameter of said main body portion.

3. The spool of claim 2 wherein said spool main body portion has a plurality of equally spaced raised contact areas having a collective outside diameter at least as large as the inside diameter of said container.

4. The spool of claim 2 wherein:
a. said fluid specimen is whole human blood; and
b. the specific gravity of said spool is in the range from about 1.04 to about 1.055.

5. The spool of claim 2 wherein the minimum diameter of said spool central axial orifice is at least as large as the inside diameter of a needle or cannula used for introducing said blood into said container.

6. A partitioning assembly for use in effecting complete physical and chemical partitioning of two centrifugally separated fluid phases of a fluid specimen, at a position not lower than the interface of said fluid phases, within a tubular container, said assembly comprising:
a. a spool including
  $a_1$. a generally cylindrical main body portion, having a maximum outside diameter less than the inside diameter of said container, and a central axial orifice;
  $a_2$. a resilient annular wiper portion, having a container-contacting surface adapted to continuously and sealingly engage the inner surface of said container, said wiper portion tapering outwardly away from the upper portion of said main body portion; and
  $a_3$. an annular skirt portion, extending from the lower portion of said main body portion, having a maximum outside diameter less than the inside diameter of said container and having a tapering inner surface that serves as a continuation of said central axial orifice; and
b. a float member having a peripheral surface portion adapted to make at least a continuous line contact seal with an annular surface portion of said skirt inner surface, with the specific gravities of both said spool and float member being intermediate of those of said two separated phases.

7. The partitioning assembly of claim 6 wherein:
a. said fluid specimen is whole blood;
b. said float member is a spherical plug;
c. the specific gravities of both said spool and plug are in the range of about 1.04 to about 1.055; and
d. said spool main body portion has a plurality of spaced, raised, guide areas having a maximum collective outside diameter less than the inside diameter of said container, but greater than the outside diameter of said main body portion.

8. The partitioning assembly of claim 7 wherein:
a. said fluid heavier phase consists of blood cells and fibrin; and
b. said partitioning assembly further includes a porous diaphragm or filter, secured within and across said spool central axial orifice above said float member line contact seal, said porous diaphragm or filter, having predetermined size openings that do not permit the passage of fibrin therethrough.

9. A fluid collection and partitioning assembly, for use in initially collecting a fluid specimen and thereafter, upon centrifugation of said specimen into a lighter phase and a heavier phase, for effecting complete physical and chemical partitioning of said phases at a position not lower than the interface of said fluid phases, said assembly comprising:
a. an elongated rigid tubular container, having an open end and a closed end;
b. a self-sealing closure adapted to be placed over the open end of said container and together therewith, and upon evacuation thereof, defining a closed fluid collection chamber adapted to receive said fluid specimen;
c. a spool, having a specific gravity intermediate those of said lighter and heavier phases, positioned within said fluid receiving chamber directly beneath said sealing closure and including;
  $c_1$. a generally cylindrical main body portion, having a central axial orifice and a maximum outside diameter less than the inside diameter of said container, said main body portion also having a plurality of spaced, raised, guide areas having a maximum collective outside diameter less than the inside diameter of said container but greater than the outside diameter of said main body portion;
  $c_2$. a resilient annular wiper portion having a container-contacting surface, adapted to sealingly and continuously engage the inner surface of said container, said wiper portion flaring outwardly away from the upper portion of said main body portion; and
  $c_3$. an annular skirt portion, extending from the lower portion of said spool main body portion, having a maximum outside diameter less than the inside diameter of said container, and having a tapering inner surface that serves as a continuation of said central axial orifice; and
d. a float member contained within said chamber below said spool and having a specific gravity intermediate those of said lighter and heavier phases; and
e. said resilient spool, due to its specific gravity, being adapted to move downwardly in said fluid receiving chamber through said lighter phase fluid in response to said centrifugation, with said lighter phase fluid flowing freely upwardly only through said spool main body central orifice, said spool further being adapted to stop moving downwardly when it reaches the vicinity of said fluid phase interface, with at least a peripheral surface portion of said float member being adapted to make at least a continuous line contact seal with an annular surface portion of the inner surface of said spool annular skirt portion, thereby effecting a seal that physically and chemically partitions said lighter phase from said heavier phase.

10. The fluid collection and partitioning assembly of claim 9 wherein:
a. said fluid specimen is whole blood;
b. said float member is adapted to be disposed in the vicinity of said fluid phase interface; and

19 c. the specific gravities of both said spool and float member are in the range from about 1.04 to about 1.055.

11. The fluid collection and partitioning assembly of claim 10 wherein:
   a. said float member is a spherical plug; and
   b. said rigid tubular container has an annular constriction in the vicinity of said open end thereof.

12. The fluid collection and partitioning assembly of claim 11 wherein the maximum collective outside diameter of the guide areas of said spool is greater than the minimum inside diameter of the annular constriction of said tubular container.

13. A method of establishing complete physical and chemical partitioning of the heavier phase from the lighter phase of a centrifugally separated fluid specimen within a unitary tubular container, said method comprising:
   a. freely disposing within said container a float member having a specific gravity intermediate those of said lighter and heavier fluid phases;
   b. providing said container with a spool, said spool being in continuous sealing contact with the inner surface of said container at a position above said fluid specimen and having a central axial orifice as well as a specific gravity intermediate those of said lighter and heavier fluid phases;
   c. moving said spool downwardly within said container through said fluid lighter phase, in response to an externally applied non-contacting centrifugal force, thereby establishing an upward flow of said fluid lighter phase within said container only through said spool central axial orifice; and
   d. establishing at least a continuous line contact seal between said float member and said spool central axial orifice when said spool reaches a position in the vicinity of said fluid phase interface, thereby effecting complete physical and chemical partitioning of said lighter and heavier fluid phases, and thereafter terminating said applied force.

14. The method of claim 13 including continuing the application of said externally applied non-contacting centrifugal force after establishing said seal between said float member and said spool central axial orifice thereby causing any material remaining in said lighter phase and having a specific gravity greater than that of said float member to move through said spool central axial orifice, push aside said float member and move therebelow, with said float member thereupon resealing itself against said spool after the passage of said material.

15. The method of claim 13 including maintaining continuous liquid sealing contact between said spool and the inner surface of said tubular container while moving said spool downwardly to a position in the vicinity of said fluid phase interface.

16. A partitioning assembly for effecting the physical partitioning of the cell and fibrin phase from the serum phase of a centrifugally separated whole blood specimen at a position not lower than the interface between said phases within a tubular container, said assembly comprising:
   a. a spool having a specific gravity in the range of from about 1.04 to about 1.055 and including:
      $a_1$. a generally cylindrical main body portion having an open central axial orifice extending axially therethrough, said main body portion having a maximum outside diameter less than the inside diameter of said container;
      $a_2$. a resilient annular wiper portion having an outer container-contacting surface continuously and sealingly engaging the inner surface of said container and an inner conical surface forming a continuation of said central axial orifice, said wiper portion tapering outwardly away from the upper portion of said main body portion; and
      $a_3$. an annular skirt portion extending from the lower portion of said main body portion having a maximum outside diameter less than the inside diameter of said container and having a tapering inner surface that serves as a continuation of said central axial orifice; and
   b. natural plug means of coagulated cells and fibrin for forming at least a continuous network across said central axial orifice adjacent said tapering inner surface for restraining said cell and fibrin phase from passing through said orifice.

17. A partitioning assembly for use in effecting the temporary physical partitioning of the heavier phase from the lighter phase of a centrifugally separated fluid specimen, at a position not lower than the interface of said fluid phases, within a tubular container, said assembly comprising:
   a. a spool having a specific gravity intermediate that of said heavier and lighter phases including:
      $a_1$. a generally cylindrical main body portion, having a maximum outside diameter less than the inside diameter of said container, and an open central axial orifice extending axially therethrough;
      $a_2$. a resilient annular wiper portion, having an outer container-contacting surface continuously and sealingly engaging the inner surface of said container, said wiper portion tapering outwardly away from the upper portion of said main body portion; and
      $a_3$. an annular skirt portion, extending from the lower portion of said main body portion, having a maximum outside diameter less than the inside diameter of said container and having a tapering inner surface that serves as a continuation of said central axial orifice; and
   b. porous filter means secured within and across said spool central axial orifice for providing a temporary physical barrier within said container and between said phases to delay the immediate movement of the heavier phase into said lighter phase as said container is inclined for pour-off of said lighter phase.

18. A fluid-retaining and partitioning assembly for effecting the complete physical and chemical partitioning of the heavier phase from the lighter phase of a centrifugally separated fluid specimen at a position not lower than the interface of such phases, said assembly comprising:
   a. a tubular container having an open end and a closed end for retaining said fluid specimen;
   b. a float member having a specific gravity intermediate those of said lighter and heavier phases freely disposed for movement within said tubular container;
   c. spool means having a specific gravity intermediate those of said lighter and heavier phases positioned within said container above said float member and including;

c₁. a generally cylindrical main body portion having an open central axial orifice extending axially therethrough and a maximum outside diameter less than the inside diameter of said conduit, said main body portion also having a plurality of spaced-apart, outwardly-raised, guide areas having a maximum collective outside diameter less than the inside diameter of said container but greater than the outside diameter of said main body portion;

c₂. a resilient annular wiper portion having a container-contacting outer surface sealingly and continuously engaging the inner surface of said container and a conical inner surface forming a continuation of said central axial orifice, said wiper portion flaring outwardly away from the upper portion of said main body portion; and c₃. an annular skirt portion extending from the lower portion of said spool main body portion having a maximum outside diameter less than the inside diameter of said container, and having a tapering inner surface that serves as a continuation of said central axial orifice; and d. said spool means being movable through said lighter phase within said container during centrifugation due to its specific gravity, with said lighter fluid phase flowing freely through the central axial orifice of said spool, said spool means terminating movement within said container when it reaches the vicinity of said fluid phase interface, and at least a peripheral surface portion of said float member forming at least a continuous line contact seal on an annular surface portion of said tapering inner surface of said spool annular skirt portion thereby effecting a seal that physically and chemically partitions said lighter phase from said heavier phase.

19. A fluid-retaining and partitioning assembly for effecting the physical partitioning of the cell and fibrin phase from the serum phase of a centrifugally separated whole blood specimen at a position not lower than the interface of said phases, said assembly comprising:

a. a tubular container having an open end and a closed end for retaining said fluid specimen;

b. a spool having a specific gravity intermediate those of said phases positioned within said tubular container and including;

b₁. a generally cylindrical main body portion having a central axial orifice extending axially therethrough and having a maximum outside diameter less than the inside diameter of said container, said main body portion also having a plurality of spaced-apart outwardly raised guide areas having a maximum collective outside diameter less than the inside diameter of said container but greater than the outside diameter of said main body portion;

b₂. a resilient annular wiper portion having an outer container-contacting surface sealingly and continuously engaging the inner surface of said container and a conical inner surface forming a continuation of said central axial orifice, said wiper portion flaring outwardly away from an upper portion of said main body portion; and b₃. an annular skirt portion extending outwardly from a lower portion of the main body portion of said spool having a maximum outside diameter less than the inside diameter of said container, and having a tapering inner surface that serves as a continuation of said central axial orifice;

c. porous filter means secured within and across said spool central axial orifice for inhibiting the passage of fibrin therethrough; and d. said resilient spool being movable downwardly in said container due to its specific gravity through said serum phase during centrifugation with said open central axial orifice providing a sole passageway for the upward flow of said serum phase, and said spool further being formed to stop moving downwardly when it reaches the vicinity of said phase interface, and said porous filter means in conjunction with said fibrin trapped therebelow physically partitioning said cell phase from said serum phase.

20. A blood collection and partitioning assembly, for use in initially collecting a whole blood specimen and thereafter, upon centrifugation of said specimen into a serum phase and a cell and fibrin phase, for effecting the physical partitioning of said phases at a position now lower than the interface of said phases, said assembly comprising:

a. a tubular container having an open end and a closed end;

b. a self-sealing closure over the open end of said container and together therewith defining a closed specimen collection chamber for receiving said whole blood specimen;

c. a spool having a specific gravity intermediate those of said phases positioned within said specimen receiving chamber, said spool including;

c₁. a generally cylindrical main body portion having an open central axial orifice extending axially therethrough and a maximum outside diameter less than the inside diameter of said container, said main body portion also having a plurality of spaced-apart outwardly raised guide areas having a maximum collective outside diameter less than the inside diameter of said container but greater than the outside diameter of said main body portion;

c₂. a resilient annular wiper portion having an outer container-contacting surface and an inner conical surface forming a continuation of said central axial orifice sealingly and continuously engaging the inner surface of said container, said wiper portion flaring outwardly away from the upper portion of said main body portion; and an annular skirt portion extending outwardly from the lower portion of the main body portion of said spool having a maximum outside diameter less than the inside diameter of said container, and having a tapering inner surface that serves as a continuation of said central axial orifice; and d. said resilient spool being movable downwardly in said specimen receiving chamber during centrifugation due to its specific gravity with said serum phase flowing upwardly only through said open central axial orifice, said spool being formed to stop its downward movement upon reaching the vicinity of the interface between said phases; and e. natural plug means of coagulated cells and fibrin forming at least a continuous network across said central axial orifice and restraining said cell and fibrin phase from passing through said orifice.

21. A method of establishing physical partitioning of the cell and fibrin phase from the serum phase of a centrifugally separated whole blood specimen during centrifugation within a unitary tubular container, said method comprising:

a. providing said container with a spool having a specific gravity intermediate those of said phases, and having a central axial orifice extending therethrough;

b. applying centrifugal force to said container and moving said spool downwardly therewithin through said serum phase, maintaining a continuous sealing contact between said spool and the inner surface of said container during said downward movement, simultaneously flowing said serum phase within said container upwardly through said spool central axial orifice during the downward movement of said spool;

c. stopping the downward movement of said spool upon reaching the vicinity of the interface between said cell and serum phases; and d. forming a natural plug of cells and fibrin across said central axial orifice and restraining said cell and fibrin phase from passing upwardly through said orifice.

22. A method of establishing physical partitioning of the cell and fibrin phase from the serum phase of a centrifugally separated whole blood specimen during centrifugation within a unitary tubular container, said method comprising:

a. providing said container with a spool having a specific gravity intermediate those of said phases and a central orifice which extends axially therethrough;

b. applying centrifugal force to said container and moving said spool downwardly therewithin through said serum phase, establishing an upward flow of said serum within said container only through said spool central axial orifice simultaneously with the downward movement of said spool, maintaining said spool in continuous sealing contact with the inner surface of said container; and c. terminating said applied force when said spool reaches a position in the vicinity of the interface between said phases and stopping the downward movement of said spool at such interface, and physically partitioning said cell phase from said serum phase by providing said spool, prior to positionment within said container, with a porous diaphragm in said central axial orifice which upon centrifugation forms a barrier between said phases.

* * * * *